Jan. 29, 1963   H. H. CAMPION   3,076,101
PROTECTIVE SYSTEM WITH PARALLEL DIODE ARRANGEMENT TO CAUSE
PULSE STRETCHING THUS ALLOWING SUFFICIENT RELAY CURRENT
Filed Nov. 26, 1957

INVENTOR.
HAROLD H. CAMPION.
BY Alden D. Redfield
Irwin P. Garfinkle
ATTORNEYS.

United States Patent Office 3,076,101
Patented Jan. 29, 1963

3,076,101
PROTECTIVE SYSTEM WITH PARALLEL DIODE ARRANGEMENT TO CAUSE PULSE STRETCHING THUS ALLOWING SUFFICIENT RELAY CURRENT
Harold H. Campion, Cincinnati, Ohio, assignor to Avco Manufacturing Corporation, Cincinnati, Ohio, a corporation of Delaware
Filed Nov. 26, 1957, Ser. No. 699,136
5 Claims. (Cl. 307—88.5)

This invention relates generally to an automatic overload protective system for receivers and, more particularly, to an amplifier useful in a system designed for protecting sensitive detectors against harmful or destructive signal inputs.

The problem of overload of sensitive detectors exists in many types of receivers. For example, in ordinary radio receiving apparatus used in automobiles and aircraft, means generally must be provided for protecting the detector against overload at times when the receiver passes in the vicinity of the transmitter. The problem is particularly acute in those instances when the transmitter is very powerful and the receiver is very sensitive, as will be the case in portable equipment used for direction-finding of radar transmitters in military operations. With this type of equipment it is often necessary to locate the source of very distant enemy radar equipment which may be transmitting low duty cycle pulses having frequencies ranging from 1,000 mc. to 10,000 mc.

Because of the distance involved, the detectors must be extremely sensitive; because of the wide range of frequencies which must be detected, the system may be subjected to many overloading signals, as from our own radar transmitters which may be located nearby. In a practial military system designed for use on aircraft, an antenna shutter driven by an electric motor and arranged for automatic energization on receipt of excessive signals provides the necessary protection; however, because of the extremely wide variations in pulse width and pulse repetition rate which are likely to be encountered, a unique servo-amplifier incorporating my invention is employed for providing the large amount of amplification required for energizing a relay or other electromagnetic device for the purpose of moving the shutter.

A broad object of this invention is to provide a system for protecting sensitive detectors against damaging signal inputs.

Another object of this invention is to provide an energy amplifier in which both current and time are amplified.

Another object of this invention is to provide a pulse-stretching circuit capable of amplifying small amounts of pulse energy into amounts which are sufficient to operate electromagnetic devices.

Still another object of my invention is to use two dissimilar diodes in a pulse-stretching network.

Further and more specific objects of this invention will be readily apparent from the appended claims and from the following detailed description and attached drawings, in which:

For illustration, my invention is depicted in use as an overload protective system amplifier in receiver apparatus used for military purposes in radar direction-finding; it is to be understood, however, that my invention may also be used in many other types of equipment and especially in equipment designed to receive pulse-modulated signals over a wide frequency range. In the embodiment illustrated, my overload protective system amplifier is used to operate a shutter (or shutter system) to shield a directional antenna arrangement on receipt of overloading signals, and thereby attenuate the signal delivered to the detector. Because the detectors are extremely sensitive, a relatively small signal will overload, but a relatively heavy current is required for operating the shutter. For these reasons my amplifier includes means for pulse amplification without distortion of the slope of the pulse, and also for pulse-stretching (increasing the duty cycle of the transmited pulses) to produce sufficient power for operating a relay system to energize the shutter motor.

Figure 1:
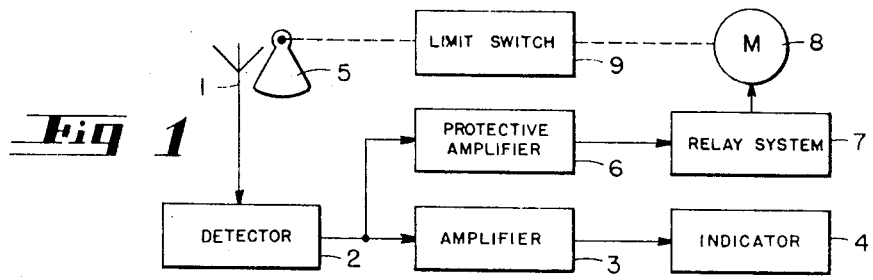
FIG. 1 is a schematic representation in block diagram form of a direction-finding system embodying my invention.

Referring to FIG. 1 of the drawings, there is illustrated a directional antenna system 1 substantially untuned and adapted to receive pulse-modulated signals in a frequency range of from 1,000 to 10,000 mc. Signals received at the antenna 1 are applied to a very sensitive detector 2, which may be a crystal detector of the commercial type IN21C or IN23C. The output from the detector 2 may be amplified in several stages of video amplification 3, and the amplified signals are then supplied to an appropriate indicator or indicators 4.

A shutter 5 is mounted adjacent the antenna 1, and on receipt of an excessively high signal it is arranged to be driven in front of the antenna 1 for the purpose of shielding the antenna and thereby attenuating the excessive signal. Preferably, the shutter 5 is composed of a ferrite material and it effectively absorbs pulse energy directed toward the antenna. For the purpose of operating the shutter 5, use is made of my novel amplifier 6 which is connected in parallel with the video amplifiers 3 across the output of detector 2. When a sufficiently large signal is detected, the output from the amplifier 6 will cause the energization of the relay system 7, thereby energizing a reversible motor 8 to drive the shutter 5. When the shutter 5 is in the proper position for shielding the antenna 1, the motor will be deenergized by means of a limit switch 9. While automatic means for returning the shutter to its original position may be used, it has been found that manual switching is preferable and practical. Hence, when the operator finds that the signal is too attenuated he can, by an appropriate switch in the relay system, energize the motor 8 for operation in the reverse direction and return the shutter to the original position. If an overload still exists, the shutter will be returned automatically to shield the antenna.

Figure 2:
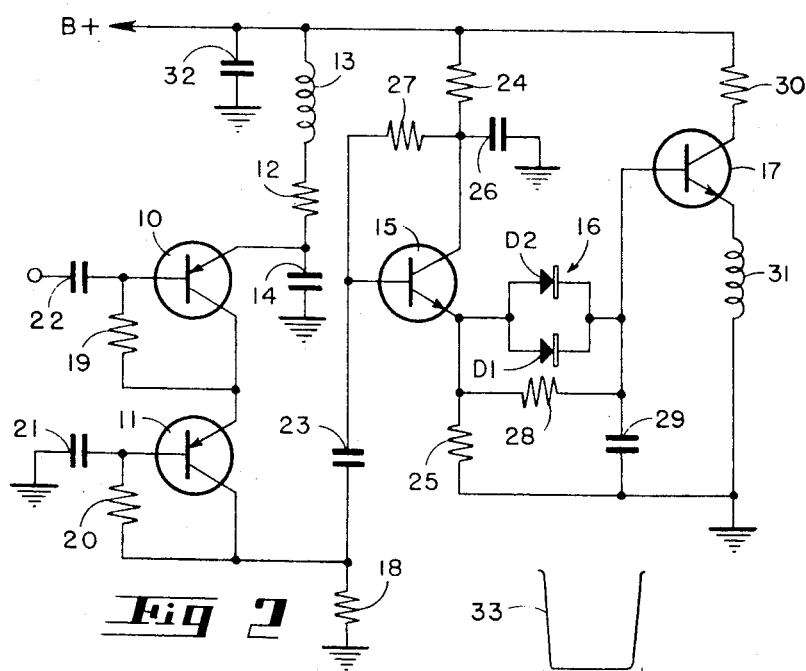
FIG. 2 is a circuit diagram of a preferred form of my protective system amplifier.

The details of my protective system amplifier 6 are illustrated in FIG. 2, and basically it comprises two stages for energizing the relays. The first (or input) stage includes a cascoded arrangement of two PNP-type transistors 10 and 11 and a reactive feedback branch, including the resistor 12, the inductor 13, and the condenser 14 for insuring faithful reproduction of the received pulse shape. (In a practical embodiment it was found that a wire-wound resistor provided the necessary small amount of inductance as well as the resistance required in the branch.) The second (or driver) stage comprises a current and time (energy) amplifier, and it includes a self-stabilized emitter-follower-transistor amplifier 15 for supplying my unique pulse stretcher 16, and a transistor amplifier 17 for supplying the relay system 7.

The transistors 10 and 11 are connected in cascode, that is, for direct currents the emitter and collector of transistor 10 and the emitter and collector of transistor 11 are connected in series, and the resistor 12 and inductor 13 of the reactive feedback branch and a collector-load-resistor 18 are connected in a series loop with the transistor electrodes and the B+ supply. For alternating currents, however, the transistor 10 is connected for common emitter operation, while the transistor 11 is connected for common base operation. That is, for alternating currents the input circuit to the transistor 10 is between the emitter and the base, and the output circuit is between the collector and the emitter, while in transistor 11 the input circuit is between the base and the emitter and the output circuit is between the collector and the base. The transistors 10 and 11 are each stabilized by means of feedback resistors 19 and 20, respectively, connected from collector to base, and the base of the transistor 11 is grounded for alternating current by means of the condenser 21. The output from detector 2 is applied to the base of transistor 10 through condenser 22, and the resultant output at the collector of transistor 10 is direct-coupled to the emitter of transistor 11. An increase in conduction through the collector of transistor 10 causes an increase in conduction through the emitter-collector electrodes of transistor 11 and, hence, an increase in current through the load resistor 18.

The resultant voltage on the load resistor 18 is capacitively coupled by means of condenser 23 to the base of driver transistor amplifier 15. The driver transistor amplifier 15 is connected common collector for alternating currents, i.e., its alternating current input circuit is between its collector and base and its alternating current output circuit is between its collector and emitter, and since it is of the NPN-type, its collector is appropriately biased from the B+ supply through a resistor 24 while its emitter is connected to ground through the emitter-load resistor 25. The collector of the transistor 15 is grounded for alternating current by means of a condenser 26, and the transistor 15 is degenerated shunt-wise by means of the feedback resistor 27 connected from the collector to the base and is degenerated series-wise by means of the emitter-load resistor 25.

The voltage across the emitter resistor 25 is applied through two dissimilar diodes D1 and D2 in the pulse-stretching network 16 and through a large resistor 28 to a large condenser 29. The voltage appearing across the condenser 29 is applied to the base of the NPN-type transistor amplifier 17, which is connected common collector for alternating currents, and is provided with appropriate operating bias from the B+ supply through a resistor 30 and through a relay winding 31 in the relay system 7. The B+ supply is bypassed for alternating currents by a condenser 32.

As was previously noted, a considerable amount of energy is required for the operation of the relay system 7, while only a very small amount of signal is required to overload the detector 2. Because of the very high pulse repetition rate and low duty cycle encountered in radar transmitters, it is necessary to provide means for preserving the slope of the pulses and also to apply pulse-stretching techniques to achieve the necessary energy amplification.

My reactive feedback branch, including the resistor 12, the inductor 13 and the condenser 14, is common to both the transistors 10 and 11 and is employed for preserving the slope of the input pulse. More specifically, the reactive feedback branch in the emitter circuit of transistor 10 functions to convert the dynamic input reactance and shunt resistance of the transistor 10 into an equivalent series resistance and reactance of a lower order across the base-emitter junction. This automatically expands the bandwidth, and thus decreases the rise and fall time of the signals impressed across the base and emitter such that it will faithfully handle the received inputs.

Figure 3:
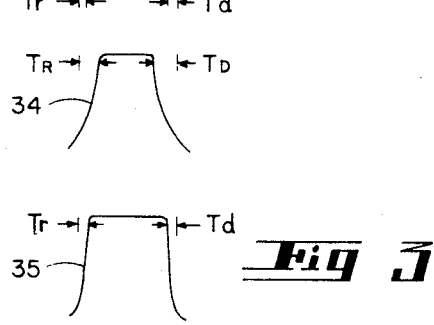
FIGS. 3 and 4 are series of curves illustrating the advantages of my invention.

The curves of FIG. 3 illustrate the performance of the reactive feedback branch. It is seen that, without reactive feedback, an input pulse 33 having a rise time $T_r$ and a fall time $T_d$ will produce an output pulse 34 having a much longer rise time $T_R$ and a much longer fall time $T_D$, thus reducing the total energy available for amplification in the second stage. However, with the compensation of the reactive feedback branch, an output pulse 35 is produced having substantially the same rise and fall times $T_r$ and $T_d$ as in the input pulse and, hence, substantially no energy is lost.

Figure 4:
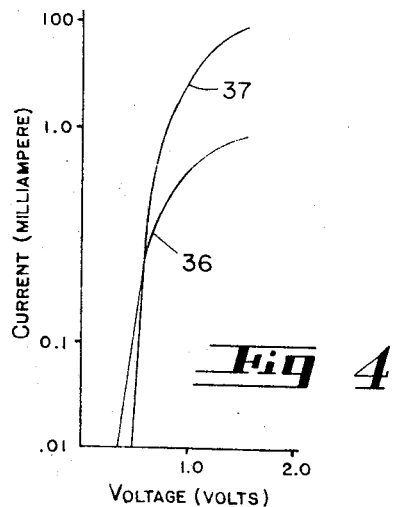

The cascoded transistors provide high impedance transformation, and function essentially as a constant current generator to provide high power gain which is used to drive the self-stabilized emitter-follower transistor 15. The amplified signal voltage developed across the emitter-load resistor 25 is applied through the pulse-stretcher 16 to the large condenser 29. Because of the high power requirements of the system, it was found that a pulse-stretching network required a diode having a high saturation current; however, a diode of this nature is relatively insensitive and, hence, the low values of current do not pass through to charge the condenser. To charge the condenser with the smaller currents and thus use all available power, a second, more sensitive diode is used. For this reason the diodes D1 and D2 in the pulse-stretcher 16 were chosen so as to exhibit characteristics such that D1 conducts at low level inputs essentially in a square law manner with applied signal voltage to its saturation level, and such that D2 starts to conduct at levels near the saturation point of D1. The preferred characteristics are illustrated in FIG. 4 where the curve 36 represents D1 and the curve 37 represents D2, the voltage ordinants being plotted on a linear scale and the current ordinants being plotted on a logarithmic scale. Thus, the signal applied to the pulse-stretcher 16 will be applied first through the diode D1, and then through the diode D2 to charge the large condenser 29. This action has the effect of charging the condenser with all available current and, thus, stretching the effective duration of the pulse.

The diode D2 may conduct at any time before saturation of diode D1; however, in order to realize the full available power, it is preferable that diode D2 conducts just slightly before saturation of diode D1. Moreover, many additional diodes may be used to achieve added stretching if diodes D1 and D2 are not large enough to handle all the power available.

Since the forward resistance of the diodes is very low, compared with the reverse resistance, the condenser 29 will charge rapidly but will tend to discharge very slowly. Further, since the condenser 29 is very large, substantially all alternating current components are removed, and the transistor 17 becomes a direct current amplifier controlled directly by signal level. In other words, in charging the condenser 29 first through diode D1 and then also through diode D2, the entire energy of the input pulses is stored and amplified. The large amount of energy stored in condenser 29 is then used to drive the base of transistor 17 to provide enough emitter current to energize the relay windings 31 in the relay system 7, and operate the motor 8. The shunt resistances 25, 28 and 30 and the base-collector junction resistance of transistor 17 form an automatic potentiometer controlling the effective base elevation with respect to the emitter with signal input level. This action effects excellent level control for the transistor 17.

It has been found that the pulse-stretching techniques described were effective for a wide range of pulse widths at various pulse repetition frequencies and at a wide range of voltage input levels.

While I do not intend to be limited by specific circuit parameters, the following values were used successfully in a working embodiment of my invention:

| | |
|---|---|
| Transistor 10 | Type 2N114. |
| Transistor 11 | Type 2N114. |
| Transistor 15 | Type 2N184. |
| Transistor 17 | Type 2N184. |
| Resistor 12 and Inductor 13 | A wire-wound 2.7 ohm resistor. |
| Resistor 18 | 1,500 ohms. |
| Resistor 19 | 1.5 megohms. |
| Resistor 20 | 75K ohms. |
| Resistor 24 | 1,000 ohms. |

| | |
|---|---|
| Resistor 25 | 1,000 ohms. |
| Resistor 27 | 820K ohms. |
| Resistor 28 | 1.5 megohms. |
| Resistor 30 | 2,200 ohms. |
| Condenser 14 | 1.0 µf. |
| Condenser 21 | .05 µf. |
| Condenser 22 | .0047 µf. |
| Condenser 23 | 0.50 µf. |
| Condenser 26 | 0.25 µf. |
| Condenser 29 | .5 µf. |
| Condenser 32 | 50 µf. |
| Diode D1 | Type HD6005. |
| Diode D2 | Type 1N202–2. |

Having described my invention, what I now claim is:

1. In a system for amplifying the energy level of pulses of electrical energy, the combination comprising: a first transistor and a second transistor, each of said transistors having an input electrode, an output electrode, and a common electrode, each of said transistors having an alternating current input circuit between its respective input and common electrodes and an alternating current output circuit between its respective output and common electrodes; means supplying said pulses to the alternating current input circuit of said first transistor; means coupling the alternating current output circuit of said first transistor to the alternating current input circuit of said second transistor; a source of direct voltage; a reactive feedback branch including a series-connected inductor and condenser; means cascoding the electrodes of said first and second transistors in a series loop including said source and said inductor of said reactive feedback branch, said condenser being connected between the common electrode of said first transistor and the common electrode of said second transistor; a third transistor and a fourth transistor, each of said transistors having base, emitter and collector electrodes, said transistors being connected common collector for alternating currents; means coupling the alternating current output circuit of said second transistor to the alternating current input circuit of said third transistor; and means coupling the output circuit of said third transistor to the input of said fourth transistor, said output circuit of said third transistor comprising first and second parallel-connected diodes having dissimilar conducting characteristics and connected in series between the emitter of said third transistor and a condenser, said condenser being connected to the input circuit of said fourth transistor.

2. The invention as defined in claim 1 wherein said input, output, and common electrodes of said first transistor are base, collector and emitter electrodes respectively, and wherein said input, output, and common electrodes of said second transistor are emitter, collector and base electrodes respectively, and wherein said means cascoding the electrodes of said first and second transistors is a series direct current connection between the emitter and collector electrodes of said first and second transistors.

3. The invention as defined in claim 1 wherein the conducting characteristics of said diode are such that said first diode is non-conductive until said second diode is substantially saturated.

4. Means for storing a series of pulses of a source of electrical energy comprising: a first transistor and a second transistor, each of said transistors having an alternating current input circuit and an alternating current output circuit; means coupling said source of electrical energy to the input circuit of said first transistor; means coupling the output circuit of said first transistor to the input circuit of said second transistor, said output circuit of said first transistor comprising first and second parallel-connected diodes, said diodes having characteristics such that said second diode is non-conductive until said first diode is substantially saturated; a large condenser connected in series with said parallel-connected diodes, said input circuit of said second transistor being connected across said condenser; and means for operatively biasing said transistors with a source of direct current.

5. In a system for amplifying the energy level of pulses of electrical energy having a relatively high pulse repetition rate and a relatively low duty cycle, the combination comprising: an amplifier for amplifying the amplitude of said pulses, said amplifier having an output circuit and including means for maintaining substantially constant the wave form of said pulses, said last-named means comprising a reactive feedback network for said amplifier; and pulse-stretching means coupled to said output circuit, said pulse-stretching means comprising a plurality of parallel-connected diodes and a condenser supplied with said pulses of electrical energy from said output circuit through said plurality of parallel-connected diodes, the conducting characteristics of said plurality of diodes being such that each conducts and becomes saturated at a different level of operation.

References Cited in the file of this patent

UNITED STATES PATENTS

| | | |
|---|---|---|
| 2,240,289 | Dillenburger | Apr. 29, 1941 |
| 2,581,273 | Miller | Jan. 1, 1952 |
| 2,666,861 | Campbell | Jan. 19, 1954 |
| 2,698,386 | Eberhard et al. | Dec. 28, 1954 |
| 2,700,732 | Holdam | Jan. 25, 1955 |
| 2,707,751 | Hance | May 3, 1955 |
| 2,723,346 | Magnuson | Nov. 8, 1955 |
| 2,731,557 | Clayden | Jan. 17, 1956 |
| 2,735,007 | McCurdy | Feb. 14, 1956 |
| 2,816,179 | Gittleman | Dec. 10, 1957 |
| 2,888,579 | Wanlass | May 26, 1959 |